United States Patent
Gonidec et al.

[19]

[11] Patent Number: 6,076,347

[45] Date of Patent: Jun. 20, 2000

[54] TURBOJET ENGINE THRUST REVERSER HAVING SCOOP DOORS AND MOVABLE UPSTREAM VISORS

[75] Inventors: Patrick Gonidec, Montivilliers; Jean Fabrice Marcel Portal, Ste Adresse; Vincent Joseph Rodolphe Studer; Guy Bernard Vauchel, both of Le Havre, all of France

[73] Assignee: Hispano-Suiza Aerostructures, France

[21] Appl. No.: 09/092,137

[22] Filed: Jun. 5, 1998

[30] Foreign Application Priority Data

Jun. 5, 1997 [FR] France ................................. 97 06941

[51] Int. Cl.$^7$ ........................................................ F02K 1/70
[52] U.S. Cl. ...................... 60/226.2; 60/230; 244/110 B; 239/265.29; 239/265.31
[58] Field of Search ................................... 60/226.2, 230; 244/110 B; 239/265.19, 265.23, 265.27, 265.29, 265.31

[56] References Cited

U.S. PATENT DOCUMENTS

| | | | |
|---|---|---|---|
| 3,601,992 | 8/1971 | Maison | 60/226.2 |
| 3,605,411 | 9/1971 | Maison et al. | 60/226.2 |
| 3,739,582 | 6/1973 | Maison | 60/226.2 |
| 4,894,985 | 1/1990 | Dubois et al. | 60/226.2 |
| 5,003,770 | 4/1991 | Schegerin et al. | 60/226.2 |
| 5,040,730 | 8/1991 | Hogie et al. | 60/230 |
| 5,937,636 | 8/1999 | Gonidec et al. | 60/226.2 |
| 5,983,625 | 11/1999 | Gonidec et al. | 60/226.2 |
| 5,987,881 | 11/1999 | Gonidec et al. | 60/226.2 |

FOREIGN PATENT DOCUMENTS 0 771 945  5/1997  European Pat. Off. .
2 627 807  9/1989  France .

*Primary Examiner*—Ted Kim
*Attorney, Agent, or Firm*—Bacon & Thomas PLLC

[57] ABSTRACT

A thrust reverser for a turbo-fan type turbojet-engine includes hollow, scoop-type pivoting doors (3) which, in the forward-thrust mode, are integrated into the engine and fan cowling and which, in the reversed-thrust mode, constitute scoop type flow deflecting baffles. A movable upstream visor (23), when in the forward-thrust mode, is situated between the upstream edge of the door (3) and the fixed upstream structure (6) covering the downstream structure of the forward frame (8) of the thrust reverser. The control-driven upstream visor (23) pivots about a pivot mounted on the fixed thrust reverser structure and, in the thrust-reversal mode, uncovers the downstream edge of the structure of the forward frame structure (8) and presents an aerodynamic surface to guide the reverse-thrust flow.

12 Claims, 7 Drawing Sheets

TURBOJET ENGINE THRUST REVERSER HAVING SCOOP DOORS AND MOVABLE UPSTREAM VISORS

BACKGROUND OF THE INVENTION

The present invention relates to a bypass turbo-fan type turbojet engine thrust reverser. In such engines, a duct may be provided downstream of the fan to channel the so-called cold, bypass air exhausting flow from the fan. The duct consists of a fixed structure or fan nozzle having an inner surface which surrounds the engine proper and an outer wall, the upstream portion of which may be an extension of the surface of the portion of the cowling which surrounds the fan. The fan nozzle may channel both the bypass flow and the so-called hot, primary flow exhausting from the rear of the engine proper (in which case the hot and cold flows may be mixed or may channel only the bypass flow when so-called separate flows are involved.

As suggested above, a wall may fair the outside of the engine, that is, the outside of the casing or cowling enclosing the fan and the outside of the outer wall of the above described duct in order to minimize powerplant drag. This applies in particular to powerplants mounted on the outside of the aircraft, especially when these powerplants are attached under the wings or affixed to the rear of the fuselage.

The French patent application No. 96.09705 (FR-A2,752, 017) published Feb. 6, 1998 describes an illustrative embodiment shown in FIG. 1 of the attached drawings of a thrust reverser fitted with scoop doors and associated with a bypass turbojet-engine.

This thrust reverser consists of a movable assembly and a fixed structure. The movable assembly is composed of hollow scoop type doors 3 that form movable components 2 and, in the forward-thrust mode, provide a surface which is contoured to form part of the exterior surface of the cowling. The fixed structure consists of an upstream portion 6 upstream of the doors 3, a downstream portion 7 downstream of the doors 3, and beams (not shown) connecting the upstream portion 6 to the downstream portion 7 and extending between the sides of the doors 3, the fixed structure also being part of the exterior cowling.

The doors 3 are located along a circumference of the cowling and are pivotable about an axis located in a downstream region of the doors by means of a pivot coupled to the circumferential sides of the doors and to the beams (not shown) which connect the downstream portion 7 to the upstream portion 6 of the cowling. The beams are situated on each side of the doors 3 along the door side walls connecting the outer surface or panel 4 of the doors 3 that constitutes a segment of the exterior cowling wall to the inner wall 5 constituting part of the outer wall of the bypass duct.

The fixed upstream portion 6 comprises a forward frame 8 which may support the means controlling the displacement of the doors 3 such as linear actuators. These means controlling the displacements of the doors 3 also may be situated at other locations on the periphery of the door 3 such as downstream at the door. In the latter case the downstream structure 7 of the fixed structure may support the control means.

When driven towards thrust reversed positions, the doors 3 pivot in such manner that the portion of the doors upstream of the pivots 9 more or less fully obstruct the duct while opening passages in the external cowling to allow channeling of the bypass flows 13 and 14 in a lateral or outward direction relative to the duct axis both in the conduit or exhaust passage 10 formed by the structure of the scoop door 3 and between the deflecting edge and the outside of the outer structure 4 of the door.

The downstream end of each door 3 moves in the vicinity of the outside of the external cowling. The doors' pivot angle is adjusted to allow passing the deflected flow and to substantially reduce, even suppress the forward thrust from this flow and to generate a counter-thrust by producing an upstream-deflected flow component.

Because the excursions of the doors are constrained by aerodynamically dimensioning the flow passages in the cross-sections cleared by the upstream portions of the doors and by the positions of the doors in the reversed-thrust mode, the above described thrust reverser has a protruding shape 12 downstream of and outside the forward frame 8. A more or less pronounced dead-air or stagnant air zone 11 is generally encountered in this area with conventional door designs that reduces the effective passage cross-section for the flow 14 while limiting the reverse angle of the flow 14 toward the front of the cowling. This dead air zone 11 effectively constitutes an aerodynamic plug reducing the effective cross-section of the deflected reversed flow stream.

The decrease in the effective passage cross-section of the thrust-reversal flow entails degradation in aerodynamic performance. Achieving an effective area and direction of the reversed flow stream would require repositioning the pivot 9 in the downstream direction and increasing the length of the door 3, thereby reducing the exhaust cross-section of the flow 13 of the scoop door because the aerodynamic flow lines must be more concentrated downstream of the cowling. Lengthening the door 3 also reduces its opening angle and hence reduces the clearance between the exhaust cross-section 15 of the conduit of door 3 and the downstream visor 16 which serves as a forwardly extending fairing of the exterior surface of rear fixed structure 7. Lastly, the angular declination of the door 3 in the thrust reversed mode will be less upon lengthening the door and thus the thrust-reversal flow will be given a smaller forward velocity component.

Known designs have been proposed to improve such thrust reverser performance. For example, U.S. Pat. No. 3,605,411 discloses a conventional thrust reverser door design using a baffle on the fixed structure upstream of the door. This baffle must project outside the cowling to act as a barrier against the thrust-reversal flow to prevent this flow from being re-ingested by the engine. This baffle furthermore must be operated independently of the door.

French patent document A 2,627,807 also discloses a conventional thrust reverser door design which includes an inside cavity which creates aerodynamic perturbations in the path of the forward-thrust flow. A lip is situated at the base of the door deflection edge to smooth part of the external flow and rotates to a position in the thrust-reversal flow stream to improve thrust-reversal performance.

French patent application 96.15256 also suggest specifically using vanes which are combined with conventional thrust reverser doors to improve aerodynamic performance. Mounting said vanes requires an open area that must be provided in the interior of the door.

SUMMARY OF THE INVENTION

One objective of the invention is to improve the aerodynamic performance of scoop doors in a thrust reverser of the above described type, particularly when operating in the thrust-reversal mode, while avoiding the drawbacks of the known prior solutions.

This objective is attained by the present invention by providing a turbofan type turbojet-engine thrust reverser having scoop doors of the type described above with a movable visor element which is located, when in the forward thrust mode, between the upstream edge of a scoop door and the downstream edge of the exterior surface of the portion of the cowling which surrounds the fan. The visor is pivotally supported on a shaft mounted to fixed structure and is combined with displacement control means in such manner that, when the engine is operating in a reversed thrust mode, the visor is moved away from the downstream edge of the fan cowling. The downstream portion of the fan cowling is thus provided with aerodynamic surfaces to attain an optimal redirection of the thrust reversal flow stream toward the front of the engine while maintaining a maximum cross-section of this stream.

Depending on the application, the visor element can pivot so that the upstream edge of the visor initially moves away from the duct or toward the duct, and the visor may be driven independently of or by the door.

Advantageously, a secondary structure including fixed or movable vanes may be combined with the visor to increase thrust-reversal performance.

BRIEF DESCRIPTION OF THE DRAWINGS

Other features and advantages of the invention are elucidated in the following description of embodiments and in relation to the attached drawings.

DETAILED DESCRIPTION OF THE PREFERRED EMBODIMENTS OF THE INVENTION

Figure 1:
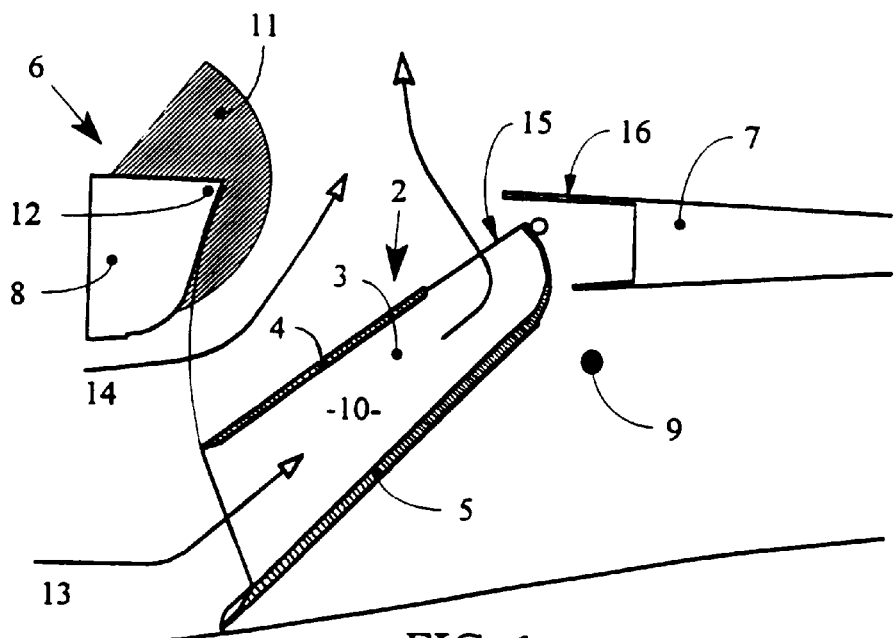
FIG. 1 is a partial-schematic longitudinal section view taken in a plane passing through the axis of rotation of a turbo-fan type turbojet engine which is provided with a thrust reverser fitted with pivoting scoop doors shown in the open position, said thrust reverser being of a known type and already described above.
Figure 14:
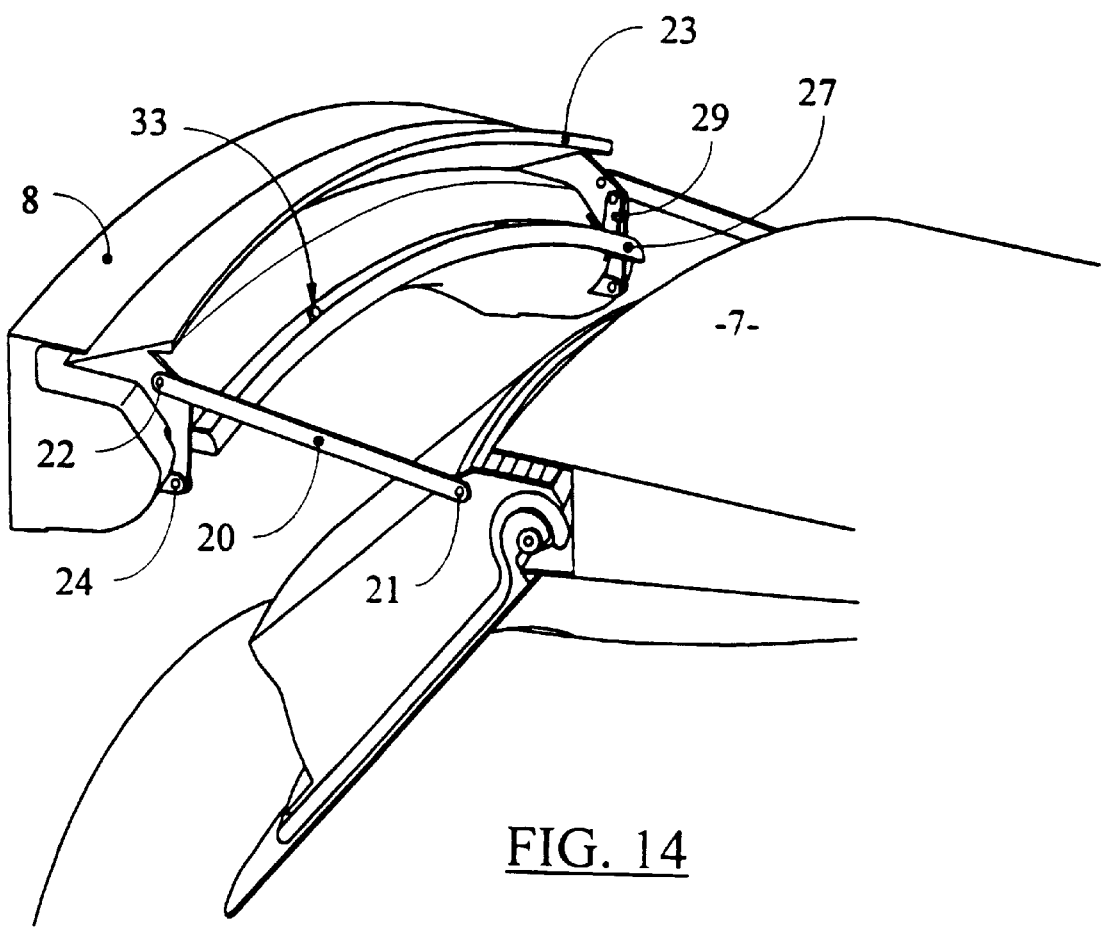
FIGS. 12–14 are perspective views of the embodiment of FIGS. 6 and 7 including movable vanes.
Figure 2:
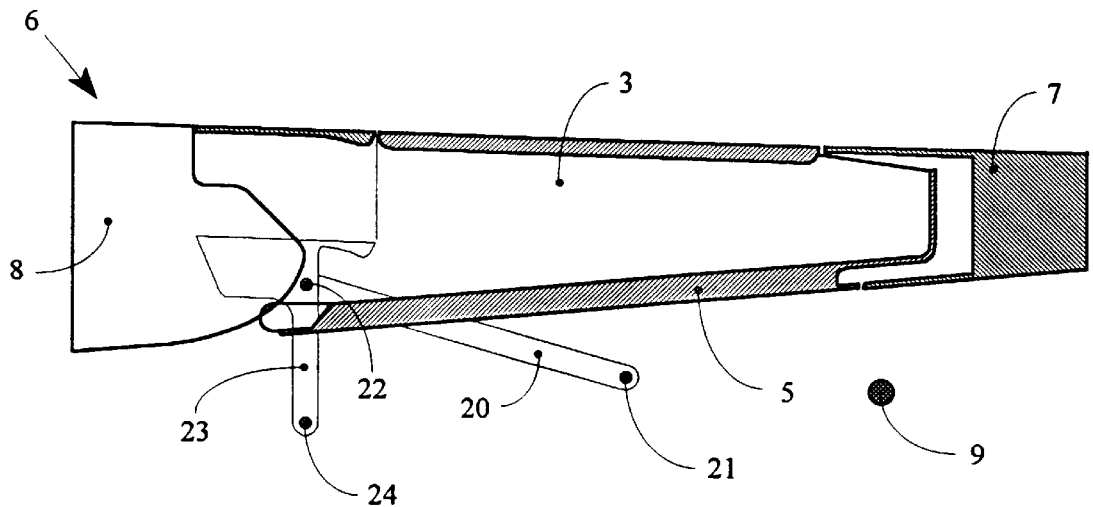
FIG. 2 shows a view similar to that of FIG. 1 of a thrust reverser of an embodiment of the invention with the scoop doors shown in the closed, forward thrust position.

In a first embodiment of the invention as shown in FIGS. 2, 3, 8 and 9, one of the scoop doors 3 of a thrust reverser pivots about shaft 9 which is supported by side beams (not shown) of the fixed structure 6 of a bypass turbojet-engine thrust reverser. Movement of the door 3 drives a forward located movable visor 23 by means of a linkage comprising at least one laterally located link 20 (i.e., at the circumferential sides of the doors) pivotally mounted at one end at 21 on the door 3 and which is drivingly connected to visor 23 at a linkage pivot point 22. The visor 23 pivots about a shaft 24 rigidly joined to the stationary structure 6, the downstream portion of the visor pivoting about shaft 24 in a radially inward direction as the door 3 is moved towards its opened position for reversed thrust operation.

In the forward thrust mode, the exterior surface of the visor 23 is faired into the outer surface of the cowling while the inner surface 26 of the visor 23 is shaped to attain the desired performance during thrust reversal. Advantageously, a bend at the inner upstream side of the surface may act as a deflector or spoiler. The streamwise length of the visor may be selected based on the design requirements and the final upstream and downstream fit of the visor may include any geometry known to those skilled in the art that may be needed to achieve a desired performance. The visor position in the thrust-reversal mode is adjusted to optimally enhance the guidance of part of the deflected flow in a desired direction.

Figure 3:
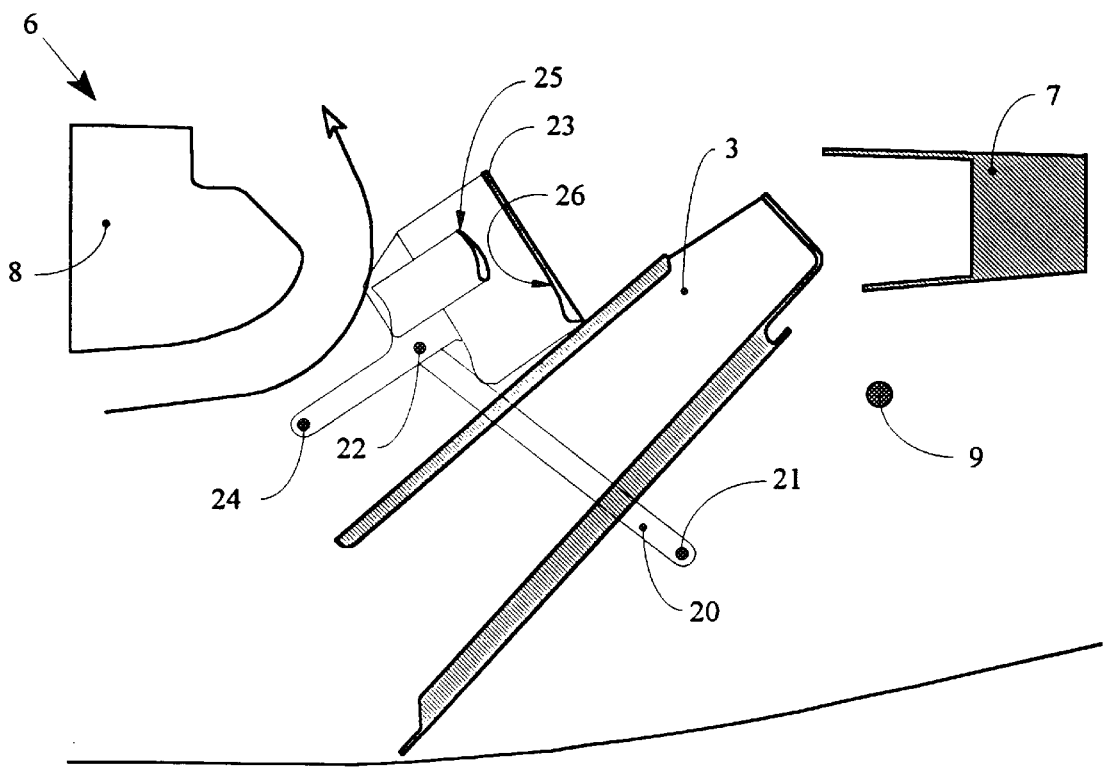
FIG. 3 shows the embodiment of FIG. 2 but with the scoop doors positioned to show the thrust-reversal mode.

The pivot 24 of the visor 23 may be situated on the side of the fixed structure or anywhere on the fixed structure of the frame 8. The configuration of the visor may be simple, or it may further comprise, as shown in FIG. 3, a secondary vane structure 25 that may be contoured to enhance the orientation of the reverse flow in a desired direction. This secondary vane structure in turn may be simple or compound curved. The location, orientation and dimensions of the secondary structures are selected to achieve the best compromise between structural strength and the desired aerodynamic performance.

If the door seal should leak during forward-thrust operation, the position of the pivot shaft 24 of the visor 23 relative to the inner surface 26 may be arranged to cause aerodynamic pressure to be applied to said inner surface so that the visor will inherently pivot toward the cowling upstream direction. This closing effect may be imparted to the door as well by a given alignment of the two pivots 21 and 22 of the link 20 relative to the door pivot 9 to enhance the self closing feature of the door 3.

To enhance the thrust-reversal performance of the flow 14, a fixed vane 32 (FIG. 11) may be affixed to the thrust reverser fixed structure and positioned in such manner relative to the surface of the deflection edge that it shall optimally act as flow smoothing means in accordance with principles known to the expert.

Figure 10:
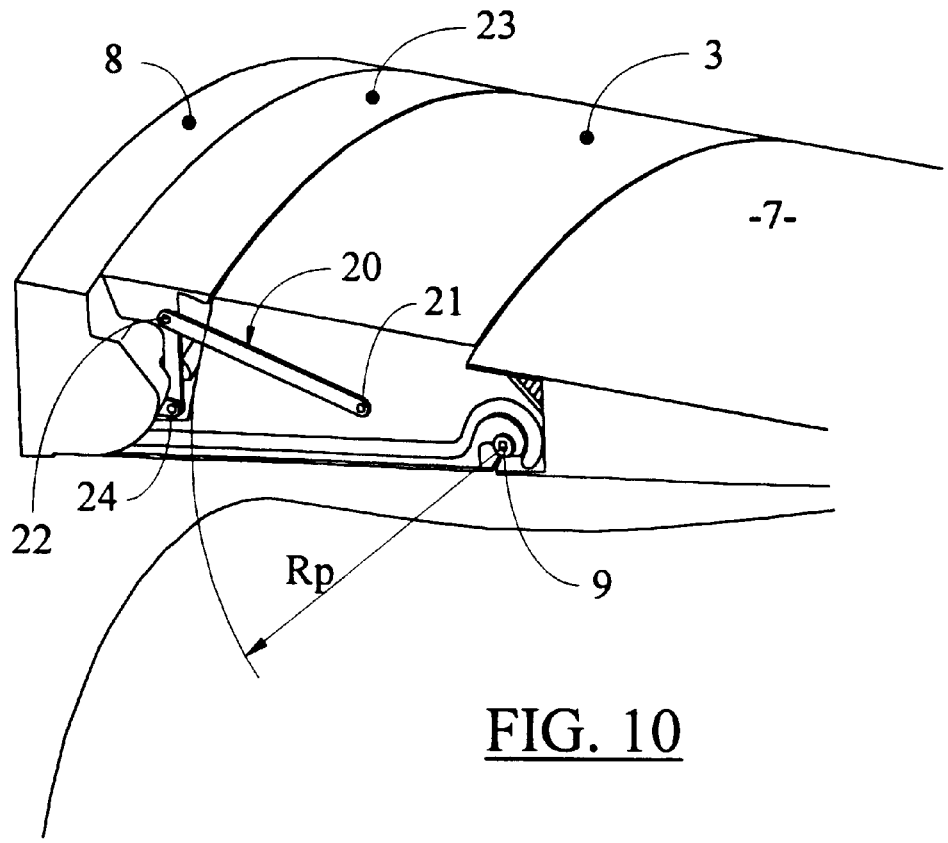
FIGS. 10, 11 are perspective views of the embodiment of FIGS. 2, 3 including a stationary vane.
Figure 11:
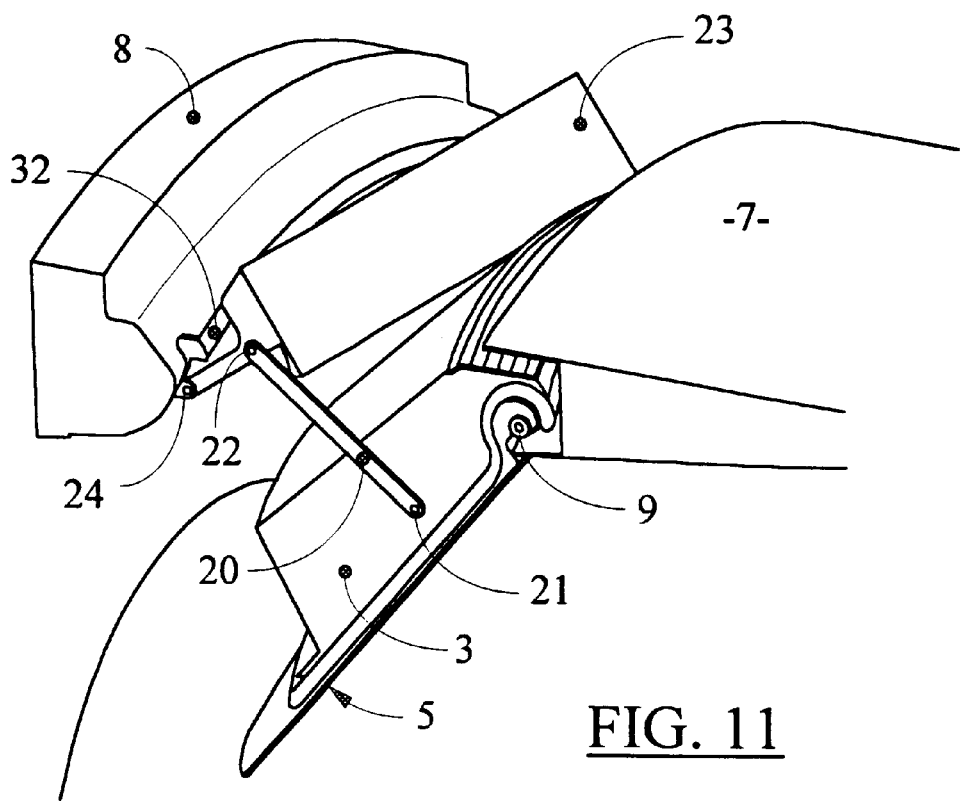
Figure 12:
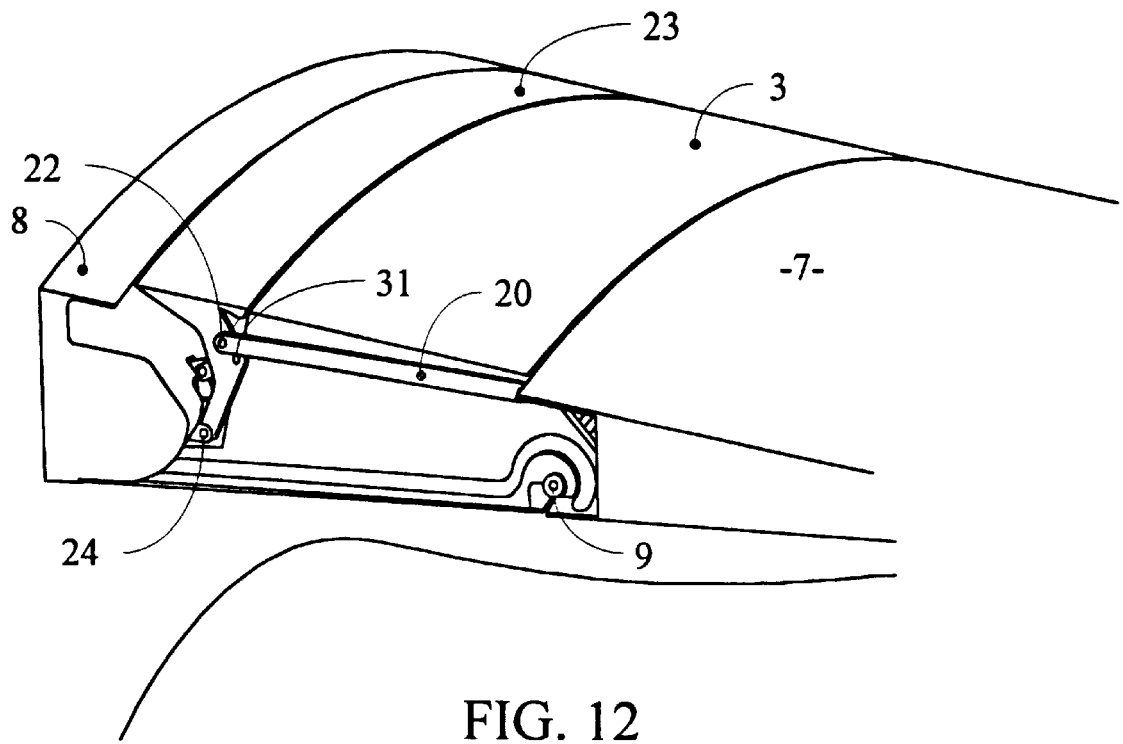
Figure 13:
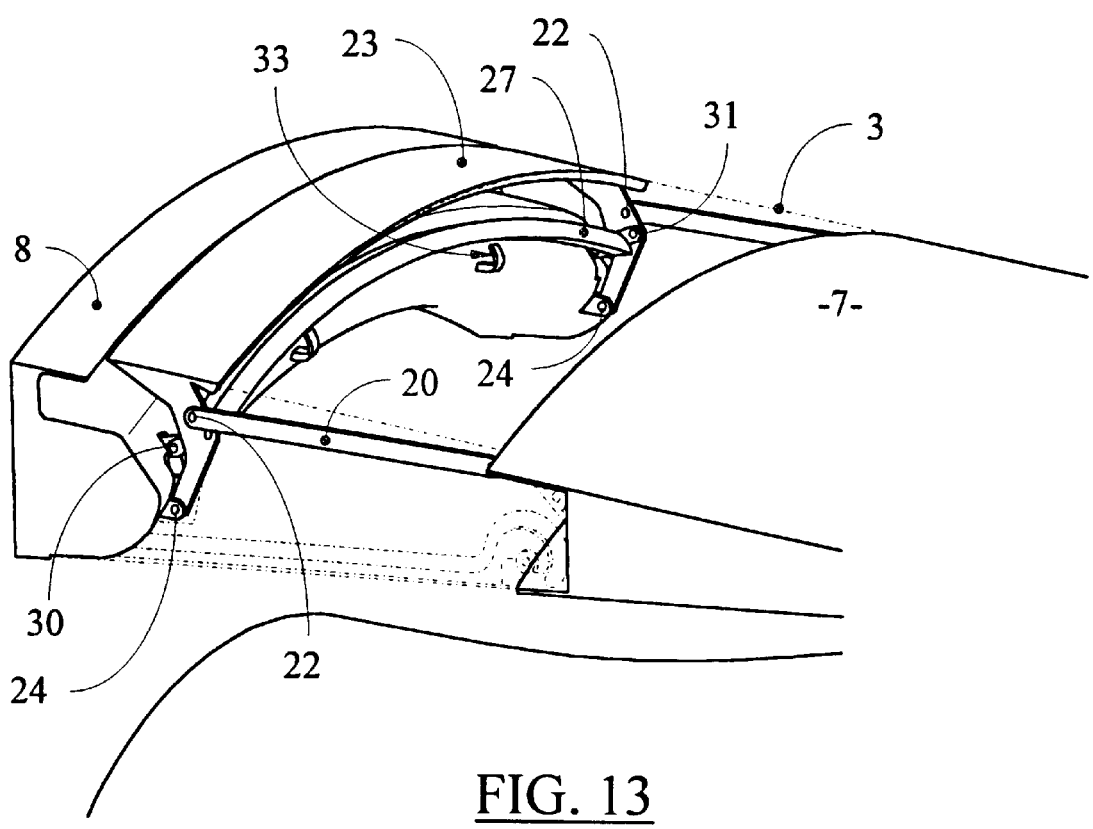

FIGS. 10 and 11 illustrate such an embodiment. For that purpose, the radius Rp of motion of the upstream outer edge of the door 3 about door pivot 9 must be less than the distance from the door pivot 9 to the downstream surface of the vane 32. In this case, the downstream edge of the visor 23 may be extended downstream as needed to maintain a smooth exterior cowling surface to compensate for any needed trimming of the edge of the exterior surface at the upstream end of the door 3.

It is understood that this design offers some latitude to include aerodynamic elements without thereby encroaching upon the inner surface 5 of the door 3.

Figure 4:
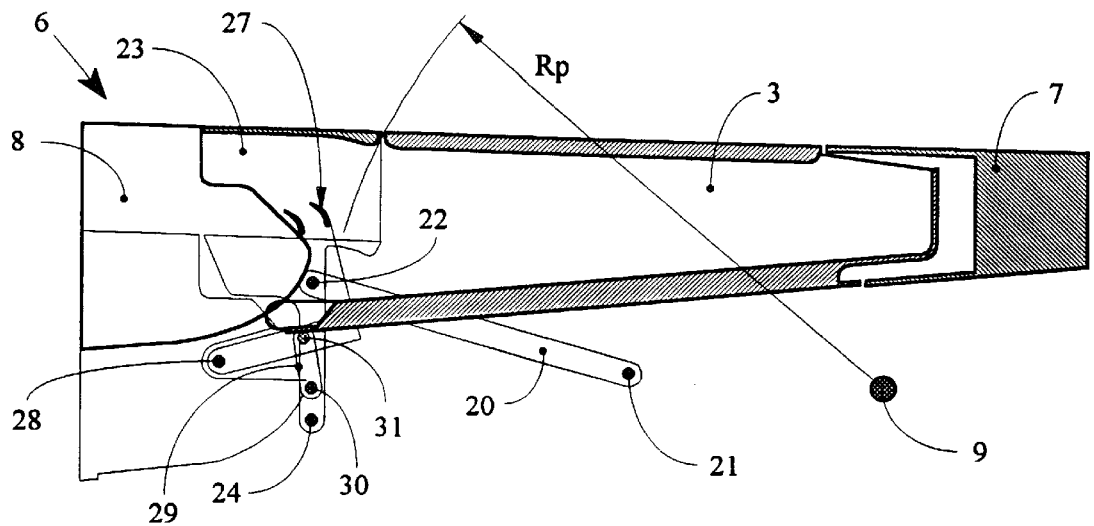
FIG. 4 shows a view similar to FIG. 1 of another embodiment of the invention comprising a thrust reverser fitted with scoop doors in the closed, forward thrust position; and further showing a driving linkage.
Figure 5:
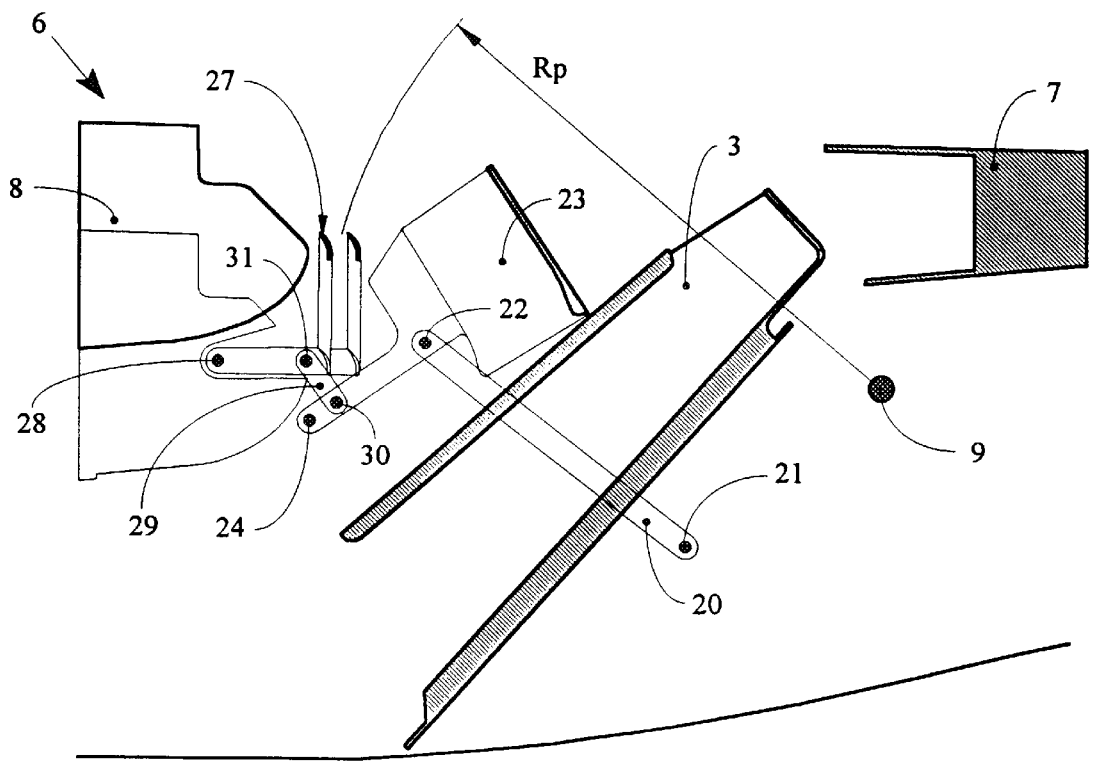
FIG. 5 shows the embodiment of FIG. 4 in the reversed thrust mode.
Figure 6:
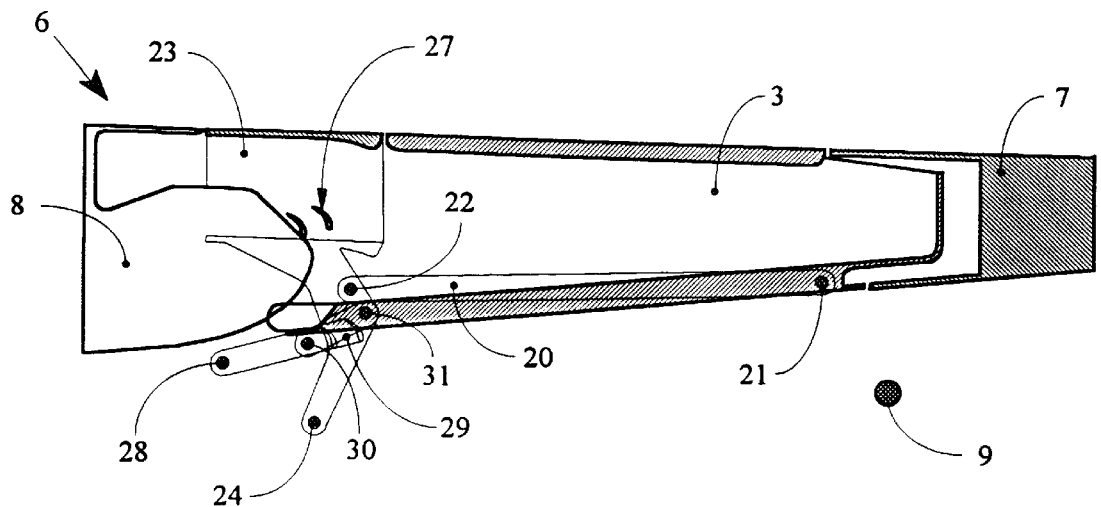
FIG. 6 shows a view similar to FIG. 1 of another embodiment of a scoop-door thrust reverser with the elements in the closed door, forward thrust mode of operation.
Figure 7:
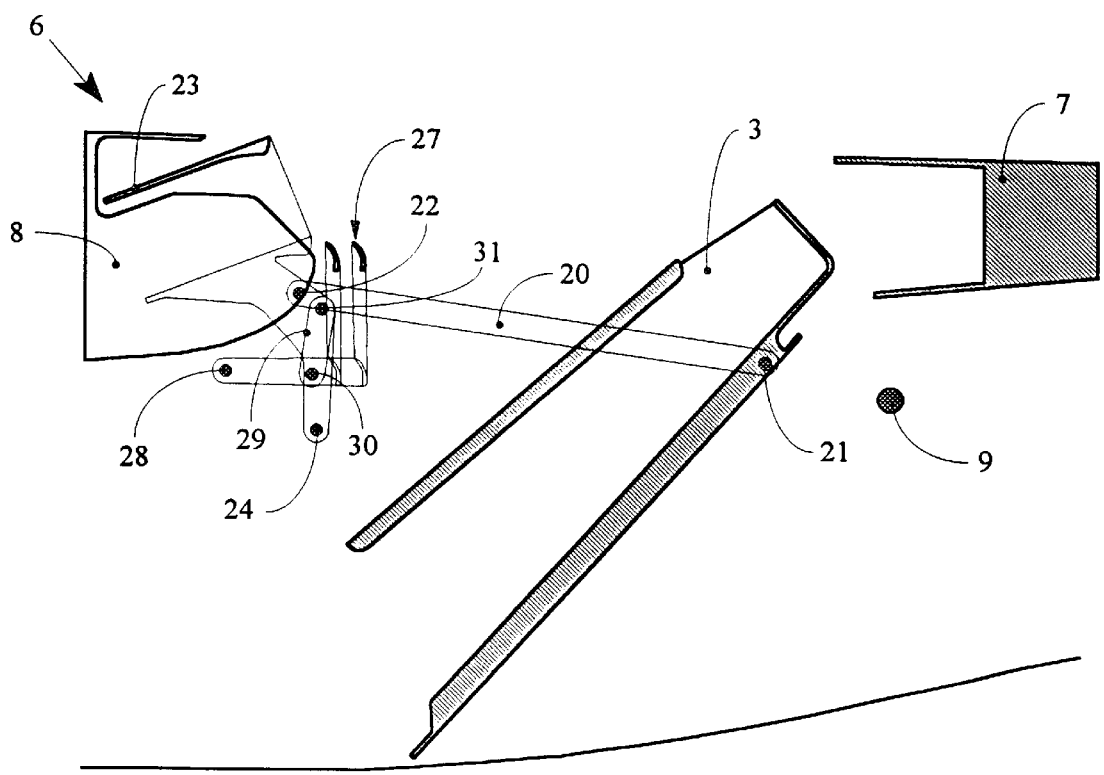
FIG. 7 shows the embodiment of FIG. 6 in the thrust-reversal mode.
Figure 8:
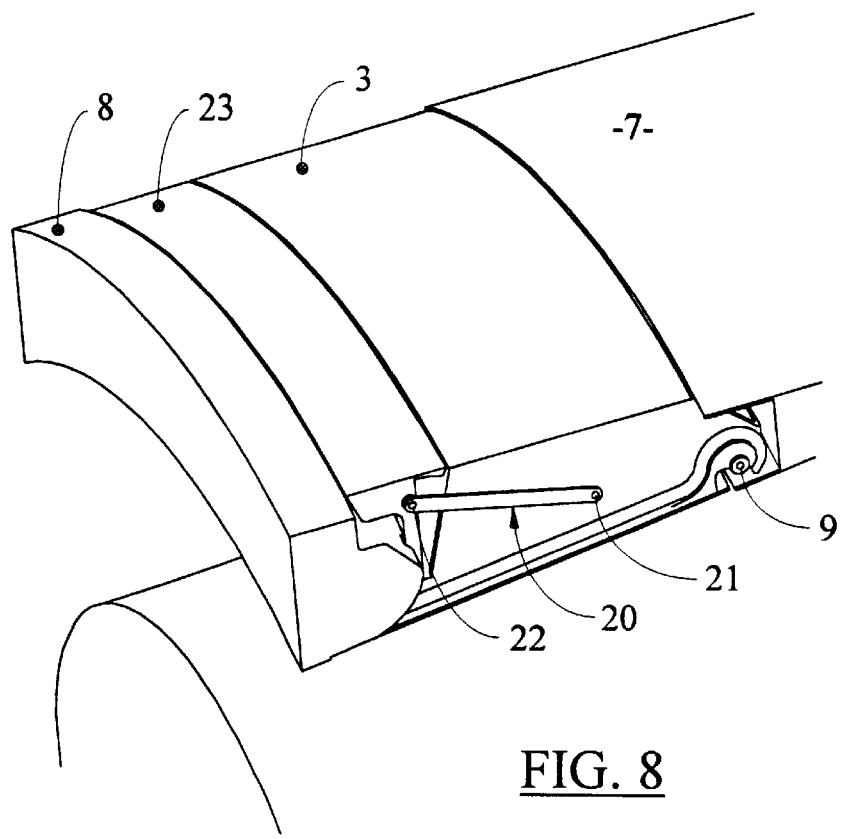
FIGS. 8, 9 are perspective views of the embodiment of FIGS. 2 and 3.
Figure 9:
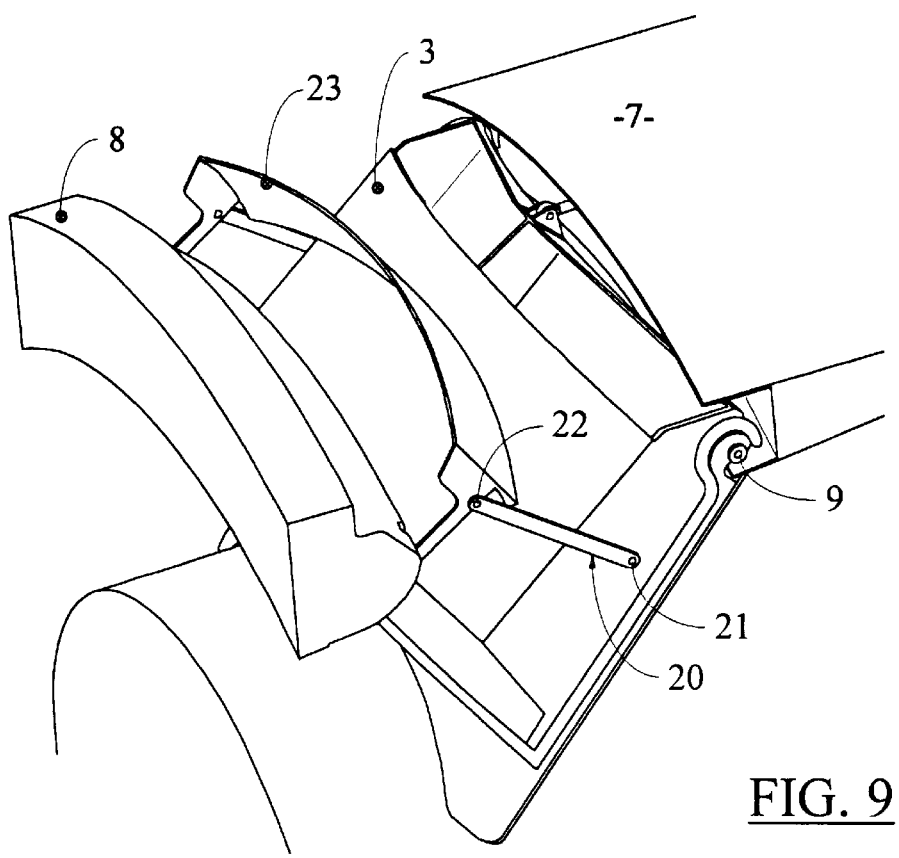

If the upstream side of the outer surface cannot be shortened enough to allow opening and closing the door 3 while maintaining clearance with a fixed vane, such as 32 (FIG. 11) a set of movable deflecting elements 27 comprising at least one deflecting vane may be installed, two such vanes being shown as comprising the moveable deflecting elements in FIGS. 4 and 5.

FIGS. 4 and 5 show an illustrative embodiment. Advantageously the design is based on displacing the visor 23 in order to drive the deflecting set of deflecting vane elements 27. Note that the door 3 may be the driving component of the set of deflecting element 27 especially when the visor 23 is not integrated into the door system.

In the embodiment shown, the support struts for the visor 23 are pivotally connected at point 30 to one end of link 29, the other end of which link is pivotally connected at point 31 to the deflecting element 27. The deflecting element 27 in turn may pivot about the pivot axis 28 which is part of or connected to the fixed structure 6.

In the forward-thrust mode as shown in FIG. 4, the set of deflecting vane elements 27 is retracted in an upstream direction in order not to interfere with the structure of the door 3 as this door is moved to its closed position. When the visor 23 is pivoted toward the downstream position as shown in FIG. 5, the drive means of the deflecting vane elements 27 is configured to move the deflecting elements 27 toward the downstream position as shown in FIG. 4. The design of the structure per se of the deflecting vane element 27 and its actuating linkage may constitute any known aerodynamic and structural configurations.

FIGS. 6, 7 and 12 through 14 show another embodiment of the invention making it possible to keep the inner surface of the visor 23 out of the thrust-reversal flow. Advantageously, this design also keeps the outer surface of the visor out of the slipstream when the visor is retracted. That is, the visor is contained within an envelope of the outer surface of the cowling when retracted. Overall, the drive means is similar in configuration to the drive means of the embodiment of FIGS. 2 and 3 where the visor is moved downstream when deploying the thrust reverser, but in this embodiment the location and geometry of the linkage rods 20 and 29 relative to the displaceable vane elements is changed so that the visor 23 is moved in the upstream direction upon opening of the scoop door 3 that occurs with deployment of the thrust reverser. Advantageously, the downstream part of the visor 23 can be optimized to assure continuity of aerodynamic contour lines rearwardly of the downstream portion of the forward frame 8 when the visors are in the thrust-reversal mode.

To minimize any bending of the deflection vane elements 27 by the reverse thrust flow, at least one buffer 33 (FIG. 13, 14) may be incorporated with the fixed structure. The buffer is compact to allow the door 3 to freely move. The shape of each vane and the kinematics of the deflecting vane element 27 cause the movable vane elements to clear the buffer 33 when moving, yet allowing the buffer to optimally hug the shape of the vane 32 and hence to effectively reinforce the structural strength of the vane 32 when in the reversed thrust position.

The visor 23 can be driven independently of the door 3 (i.e., not integrated with door structure) by any drive means known in the art and it can be independently moved before, simultaneously, or after the opening of the door. In this case, the drive means may be mounted on the side faces of the visor or on the forward frame 8.

It is also possible to drive the door 3 by means of (i.e., by motion of) the visor using the above arrangements of elements.

Advantageously, the schedule of movement of the visor 23 may be adjusted to optimize the thrust-reversal flow during the scoop door opening phase to avoid any engine operation problems.

Various modifications to the structure of the preferred embodiments to achieve the same function can be made by the person skilled in the art without departing from the scope of the invention defined by the following claims.

What is claimed is:

1. A bypass turbojet-engine thrust reverser comprising hollow, scoop type pivoting doors which, in the closed position during forward-thrust operation of the thrust reverser, form part of an external engine cowling and which, when pivoted so that upstream edges of the doors enter the bypass flow duct of the engine, the doors constitute flow-deflecting baffles while opening passages in the external cowling during reverse thrust operation;

at least part of the flow deflected by the doors being conducted by interior openings in the scoop type doors;

said thrust reverser further comprising a fixed cowling structure including an upstream portion located upstream of the doors, said upstream portion comprising a forward frame having a downstream structure; a downstream portion located downstream of the doors; and fixed longitudinal beams extending alongside the doors connecting the upstream end downstream portions;

a movable upstream visor element located, when the reverser is in the forward thrust mode, between the upstream edge of each door and the upstream portion of the fixed cowling structure, with said visor covering the downstream structure of the forward frame;

each said visor pivotally mounted to fixed structure and including a drive control system arranged such that, during reverse thrust operation, the visor uncovers the downstream structure of the forward frame and presents an optimized aerodynamic surface to the reverse flow stream deflected by a respective door so as to allow optimal guidance of the thrust reverse flow forwardly of the cowling while maintaining a reduced total cross section of the thrust reversal opening.

2. The thrust reverser according to claim 1, wherein each said upstream visor is connected to a respective door by at least one pivotable drive linkage rod.

3. The thrust reverser according to claim 1, wherein each said upstream visor includes an actuating system that, when its respective associated door is opened towards a thrust reversed position, pivots the visor towards the downstream side of the cowling with a downstream edge of the visor pivoting radially inwardly relative to a longitudinal axis of the cowling.

4. A thrust reverser according to claim 1, including a secondary vane structure associated with each upstream visor and configured such that, in the thrust reversed mode, each secondary vane structure enhances flow of the deflected reverse thrust stream.

5. A thrust reverser according to claim 1, including an actuator linkage system for each upstream visor arranged such that, when a respective door is opened, the upstream visor is pivoted towards the upstream side of the cowling; a housing formed in the forward frame for receiving the upstream visor; said visor pivoting into the housing in the thrust reversed mode; said visor configured so as not to project beyond the outer cowling surface when pivoted into the housing.

6. A thrust reverser according to claim 1, said forward frame including a downstream surface having a contoured protrusion in the form of a fixed vane; the outer upstream edge of each door being configured such that the door clears the fixed vane during its opening and closing motion; the downstream end of each upstream visor when in the forward thrust mode being positioned such that it is in smooth continuity with the outer surface of a respective door.

7. A thrust reverser as claimed in claim 1, said thrust reverser including an inner space located between the forward frame and each door when the door is closed; and a movable deflecting vane element located in each said inner space during the forward thrust mode of the thrust reverser and which is movable upon opening of each door towards a thrust reversed position into the deflected reverse flow stream between the outer surface of the door and the fixed upstream portion of the cowling structure.

8. A thrust reverser as claimed in claim 7, wherein each movable vane element is hingedly connected to the fixed upstream portion of cowling structure and includes at least one linkage rod connecting the movable deflecting vane element and the visor, said at least one linkage rod driving the deflecting vane element via the motion of the visor.

9. A thrust reverser according to claim 7, wherein at least part of the movement of each deflecting vane element is imparted by means of a connection between the deflecting vane element and a respective door.

10. A thrust reverser according to claim 7, including at least one buffer connected to the upstream portion of fixed cowling structure and located between the upstream position and at least one movable deflector vane.

11. A thrust reverser as claimed in claim 1, including a control actuator configured so as to cause each visor to be moved independently of the motion of its respective door between forward and reversed thrust positions.

12. A thrust reverser according to claim 1, each said upstream visor being connected to each door by a control system such that motion of the upstream visor produces motion of the door.

* * * * *